(12) United States Patent
Kinoshita et al.

(10) Patent No.: US 8,209,907 B2
(45) Date of Patent: Jul. 3, 2012

(54) WINDOW REGULATOR

(75) Inventors: Kimihiro Kinoshita, Kanagawa (JP);
Kenichi Suzuki, Kanagawa (JP);
Takanori Natsume, Kanagawa (JP);
Katsuaki Maruyama, Aichi (JP); Koji Kawamatsu, Aichi (JP)

(73) Assignees: Shiroki Kogyo Co., Ltd., Kanagawa (JP); Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 725 days.

(21) Appl. No.: 11/992,739

(22) PCT Filed: May 25, 2007

(86) PCT No.: PCT/JP2007/060720
§ 371 (c)(1),
(2), (4) Date: Dec. 5, 2008

(87) PCT Pub. No.: WO2007/139027
PCT Pub. Date: Dec. 6, 2007

(65) Prior Publication Data
US 2009/0090065 A1    Apr. 9, 2009

(30) Foreign Application Priority Data
May 30, 2006  (JP) .................................. 2006-149429

(51) Int. Cl.
*E05F 11/48* (2006.01)
(52) U.S. Cl. .......................................... 49/352
(58) Field of Classification Search ............. 49/348, 49/349, 352
See application file for complete search history.

(56) References Cited

U.S. PATENT DOCUMENTS

| 4,235,046 | A  | * | 11/1980 | Hess et al. ...................... 49/352 |
| 4,313,282 | A  | * | 2/1982  | Hagemann et al. ............. 49/352 |
| 4,657,523 | A  | * | 4/1987  | Chevance et al. ............. 474/101 |
| 5,749,174 | A  | * | 5/1998  | Mariel ............................. 49/352 |
| 6,202,351 | B1 | * | 3/2001  | Medebach ...................... 49/352 |
| 6,272,948 | B1 |   | 8/2001  | Klippert |
| 7,591,104 | B2 | * | 9/2009  | Takeda et al. .................. 49/352 |
| 7,774,985 | B2 | * | 8/2010  | Miyagawa et al. ............. 49/360 |
| 7,866,229 | B2 | * | 1/2011  | Casalini et al. .......... 74/501.5 R |
| 2010/0043295 | A1 | * | 2/2010 | Barr et al. ....................... 49/352 |

FOREIGN PATENT DOCUMENTS

| JP | 9-144424 | 6/1997 |
| JP | 10-299335 | 11/1998 |
| JP | 2003-293651 | 10/2003 |

* cited by examiner

*Primary Examiner* — Jerry Redman
(74) *Attorney, Agent, or Firm* — Finnegan, Henderson, Farabow, Garrett & Dunner, LLP

(57) ABSTRACT

A window regulator includes a wire sag compensating mechanism. The wire sag compensating mechanism includes an outer tube arranged between the vicinity of a drum and at least one wire guide member allowing passage of a wire therethrough and fixed at an end on the side of the wire guide member to a member where the wire guide member may be provided. A tube holding portion may be provided on a member on which the drum is provided allowing movable engagement of the drum side of the outer tube and guiding the drum side of the outer tube in the axial direction of the outer tube. A spring may be provided for urging the drum side of the outer tube away from the drum. A disengagement restricting arrangement (e.g., projections and elongated holes) may be provided for restricting the outer tube from disengaging from the tube holding portion.

2 Claims, 8 Drawing Sheets

PRIOR ART

WINDOW REGULATOR

BACKGROUND OF THE INVENTION

1. Field of the Invention

The present invention relates to a window regulator including a drum mounted to of an inner panel of a door on a surface facing an outer panel and being capable of rotating in the forward direction and the reverse direction; an annular wire partly wound around the drum; a wire guide member mounted to the inner panel of the door on the surface facing the outer panel for guiding the wire so that the wire is arranged along the direction of upward and downward movement of a window glass; and window glass mounting means for mounting the window glass to the wire at a portion along the direction of upward and downward movement of the window glass, in which the window glass is moved upward and downward by moving the wire by rotating the drum in the forward direction or the reverse direction.

2. Description of Related Art

Figure 6:
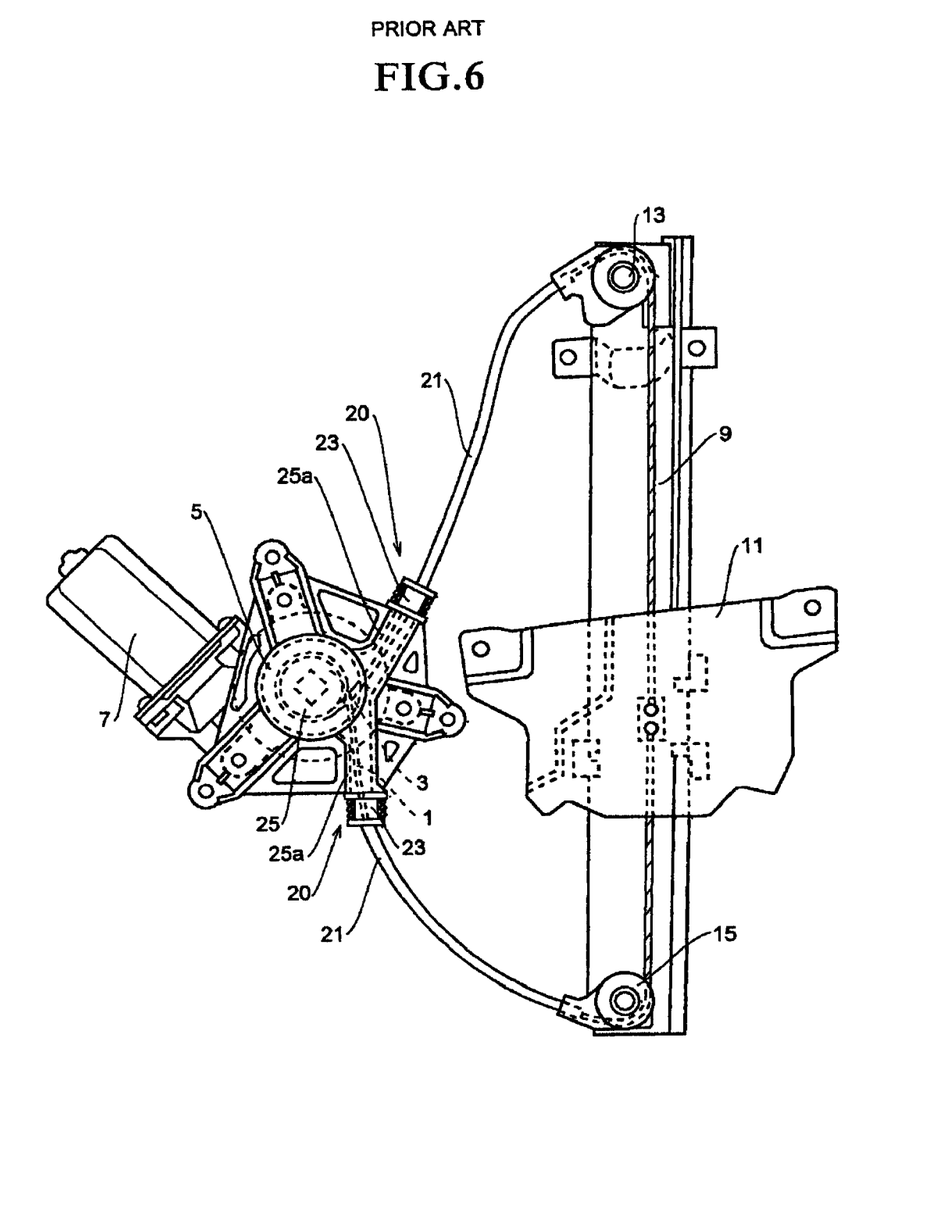
FIG. 6 is a configuration diagram showing a window regulator using a drum.

As an example of a window regulator using a drum, there is the one as shown in FIG. 6. In the drawing, a drum 3 on which a wire 1 is wound is provided in a drum housing 5, and the drum housing 5 is attached to an inner panel of a door on a surface facing an outer panel. The drum 3 is adapted to be rotated by a motor 7 in the forward direction/reverse direction.

A guide rail 9 is mounted to the inner panel of the door on the surface facing the outer panel along the direction of upward and downward movement of a window glass. A slider 11 movably engages the guide rail 9, and the window glass, not shown, is mounted to the slider 11. Therefore, the slider 11 functions as window glass mounting means.

An upper pulley 13 is provided on the upper portion of the guide rail 9, and a lower pulley 15 is provided on the lower portion thereof. The upper pulley 13 and the lower pulley 15 function as wire guide members which guide the wire 1.

One end of the wire 1 is fixed to the slider 11 via the upper pulley 13. The other end of the wire 1 is fixed to the slider 11 via the lower pulley 15.

A wire sag compensating mechanism 20 will now be described.

Figure 7:
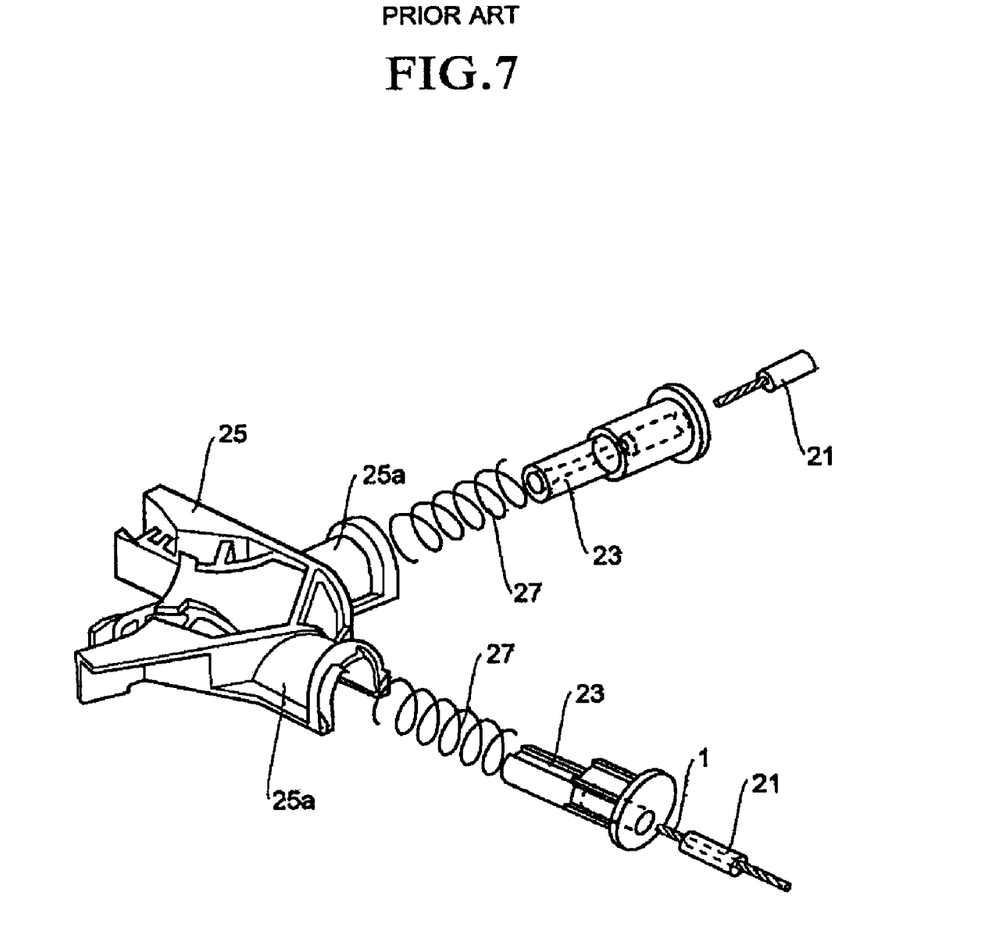
FIG. 7 is a perspective view of a wire sag compensating mechanism in FIG. 6.

Outer tubes 21 for allowing passage of the wire 1 therethrough are arranged between the drum 3 and the upper pulley 13 and between the drum 3 and the lower pulley 15. One end of the each outer tube 21 is fixed to a member on which the upper pulley 13 and the lower pulley 15 are provided. The other end, that is, the end on the drum 3 side of the outer tube 21 is provided with a slide bush 23 for allowing passage of the wire 1 therethrough as shown in FIG. 7. The slide bush 23 movably engages a cylindrical tube holding portion 25a formed on a base 25 provided with the drum 3. Therefore, the tube holding portion 25a functions as guide means which guides the outer tube 21 on the drum 3 side in the axial direction of the outer tube 21. The outer tube 21 is urged in the direction of being pushed out from the tube holding portion 25a by a spring 27 as urging means arranged in the tube holding portion 25a and abutted at one end to the bottom of the tube holding portion and at the other end to the slide bush 23 of the outer tube 21. When the wire 1 sags, the outer tube 21 is pushed out by an urging force of the spring 27 so that a wire path between the base 25 and the upper pulley 13 and a wire path between the base 25 and the lower pulley 15 are expanded, thereby absorbing the sag of the wire 1.

When the drum 3 is rotated in the forward direction or the reverse direction by driving the motor 7, and hence the wire 1 is moved, the slider 11 moves along the guide rail 9 and the window glass is moved upward or downward (for example, see Patent Document 1).

Patent Document 1: JP-A-9-144424

BRIEF SUMMARY OF THE INVENTION

Problems to be Solved by the Invention

In general, the window regulator is assembled in such a manner that an assembly including a drive source, a wire and a slider assembled together is assembled to the door as shown in FIG. 6.

In the case of the window regulator assembly of a shape as shown in FIG. 6, FIG. 7, even when the wire sag compensating mechanism 20 is in operation, since the upper pulley 13 and the lower pulley 15 are fixed to the guide rail 9, and hence the assembly is not broken into pieces due to generation of tension on the wire 1.

However, in a case of the window regulator assembly in which no guide rail 9 is provided and the upper pulley and the lower pulley are mounted directly to the door, since the tension is not generated in the wire, and hence in the case of the wire sag compensating mechanism as shown in FIG. 6 and FIG. 7, there arises a problem such that the slide bush or the outer tube comes out from the tube holding portion as the guide means due to the urging force of the spring, and hence it cannot be mounted to a vehicle.

In view of such a problem, it is an object of the present invention is to provide a window regulator having a wire sag compensating mechanism which prevents an outer tube from coming apart from guide means.

Means for Solving the Problems

The present disclosure is directed to a window regulator including a drum mounted to an inner panel of a door on a surface facing an outer panel and being capable of rotating in the forward direction and the reverse direction; an annular wire wounded partly around the drum; a wire guide member mounted to the inner panel of the door on the surface facing the outer panel for guiding the wire so that the wire is arranged along the direction of upward and downward movement of a window glass; and window glass mounting means for mounting the window glass to the wire at a portion along the direction of upward and downward movement of the window glass, wherein the window glass is moved upward and downward by moving the wire by rotating the drum in the forward direction or the reverse direction, characterized in that a wire sag compensating mechanism includes: an outer tube arranged between the vicinity of the drum and the vicinity of the wire guide member for allowing passage of the wire therethrough and fixed to one of the drum side and the wire guide member side; guide means provided on the other side of the drum side and the wire guide member side for allowing movable engagement of the outer tube therewith and guiding the outer tube in the axial direction of the outer tube; urging means for urging the outer tube in the direction away from the guide means; and disengagement restricting means for restricting the outer tube from being disengaged from the guide means.

When the drum is rotated in the forward or the reverse direction, the wire is moved and the window glass is moved upward and downward. According to the present disclosure, a slide bush which allows passage of the wire therethrough is attached to the outer tube on the guide means side, in that the guide means is a cylindrical tube holding portion having an opened surface at one end for allowing movable fitting of the slide bush of the outer tube through the opened surface, in that the urging means is a spring which comes into abutment with a member having the guide means at one end and comes into abutment with the slide bush of the outer tube at the other end for urging the outer tube in the direction to be pushed out from the tube holding portion, and in that the disengagement restricting means includes an elongated hole formed on a cylindrical surface of the tube holding portion along the axial direction and a projection which is formed on the slide bush to engage the elongated hole.

Furthermore, according to the present disclosure the tube holding portion is formed with a slit extending to the opened surface on the cylindrical surface along the axial direction and the projection has an inclined surface which is reduced in height along the elongated hole toward the member provided with the guide means.

Additionally, a slide bush which allows passage of the wire therethrough and is formed with a projection on the peripheral surface thereof is attached to the outer tube on the guide means side, in that the guide means is a cylindrical tube holding portion having an opened surface at one end, being formed with a slit extending to the opened surface along the axial direction for allowing movable fitting of the slide bush of the outer tube through the opened surface so that the projection of the slide bush fits the slit, in that the urging means is a spring which comes into abutment with a member having the guide means at one end and comes into abutment with the slide bush of the outer tube at the other end for urging the outer tube in the direction to be pushed out from the tube holding portion, in that the disengagement restricting means includes first and second slit projections formed in the vicinity of the opened surface on two surfaces facing to each other which constitute the slit of the tube holding portion respectively and projecting toward opposite surfaces where the projections by themselves are formed and having an engaged surfaces on the side of the member provided with the guide means and a projection of the slide bush engageable with the engaged surfaces of the first and second slit projections and having first and second engaging surfaces, and in that the engaged surfaces of the first and second slit projections and the first and second engaging surfaces of the projection are designed to shapes so as to restrict the further movement of the slide bush and prevent enlargement in diameter of the tube holding portion by engagement therebetween.

Furthermore, according to the present disclosure the projection of the slide bush is formed with surfaces which come into abutment with the first slit projection and the second slit projection of the tube holding portion on the side of the member provided with the guide means and enlarge the width of the slit when the slide bush is inserted into the tube holding portion.

Advantages of the Invention

According to the present disclosure, there is provided the window regulator having the wire sag compensating mechanism for preventing disengagement of the outer tube from the guide means by the provision of the disengagement restricting means which restricts the outer tube from being disengaged from the guide means.

According to an embodiment of the present disclosure, the projection formed on the slide bush comes into abutment with the end of the elongated hole, so that the further movement of the slide bush is restricted.

Additionally, the tube holding portion is formed with the slit extending to the opened surface on the cylindrical surface along the axial direction and the projection has the inclined surface which is reduced in height along the elongated hole toward the member provided with the guide means, so that when the slide bush is inserted into the tube holding portion, the tube holding portion is enlarged in diameter by the inclined surface formed on the projection of the slide bush, and hence easy insertion of the slide bush into the tube holding portion is achieved.

According to the present disclosure, the slide bush which allows passage of the wire therethrough and is formed with the projection on the peripheral surface thereof is attached to the outer tube on the guide means side, the guide means is the cylindrical tube holding portion having the opened surface at one end, being formed with the slit extending to the opened surface along the axial direction for allowing movable fitting of the slide bush of the outer tube through the opened surface so that the projection of the slide bush fits the slit, the urging means is the spring which comes into abutment with the member having the guide means at one end and comes into abutment with the slide bush of the outer tube at the other end for urging the outer tube in the direction to be pushed out from the tube holding portion, the disengagement restricting means includes the first and second slit projections formed in the vicinity of the opened surface on the two surfaces facing to each other which constitute the slit of the tube holding portion respectively and projecting toward the opposite surfaces where the project ions by themselves are formed and having the engaged surfaces on the side of the member provided with the guide means and the projection of the slide bush engageable with the engaged surfaces of the first and second slit projections and having the first and second engaging surfaces, and the engaged surfaces of the first and second slit projections and the first and second engaging surfaces of the projection are designed to shapes so as to restrict the further movement of the slide bush and prevent enlargement in diameter of the tube holding portion by engagement therebetween, so that the tube holding portion cannot be enlarged in diameter against, and hence retention thereof is further enhanced.

Furthermore, the projection of the slide bush is formed with surfaces which come into abutment with the first slit projection and the second slit projection of the tube holding portion on the side of the member provided with the guide means and enlarge the width of the slit when the slide bush is inserted into the tube holding portion. Therefore, when inserting the slide bush into the tube holding portion, the tube holding portion is enlarged in diameter by the inclined surfaces of the projection of the slide bush, so that easy insertion of the slide bush into the tube holding portion is achieved.

DETAILED DESCRIPTION OF THE INVENTION

Figure 1:
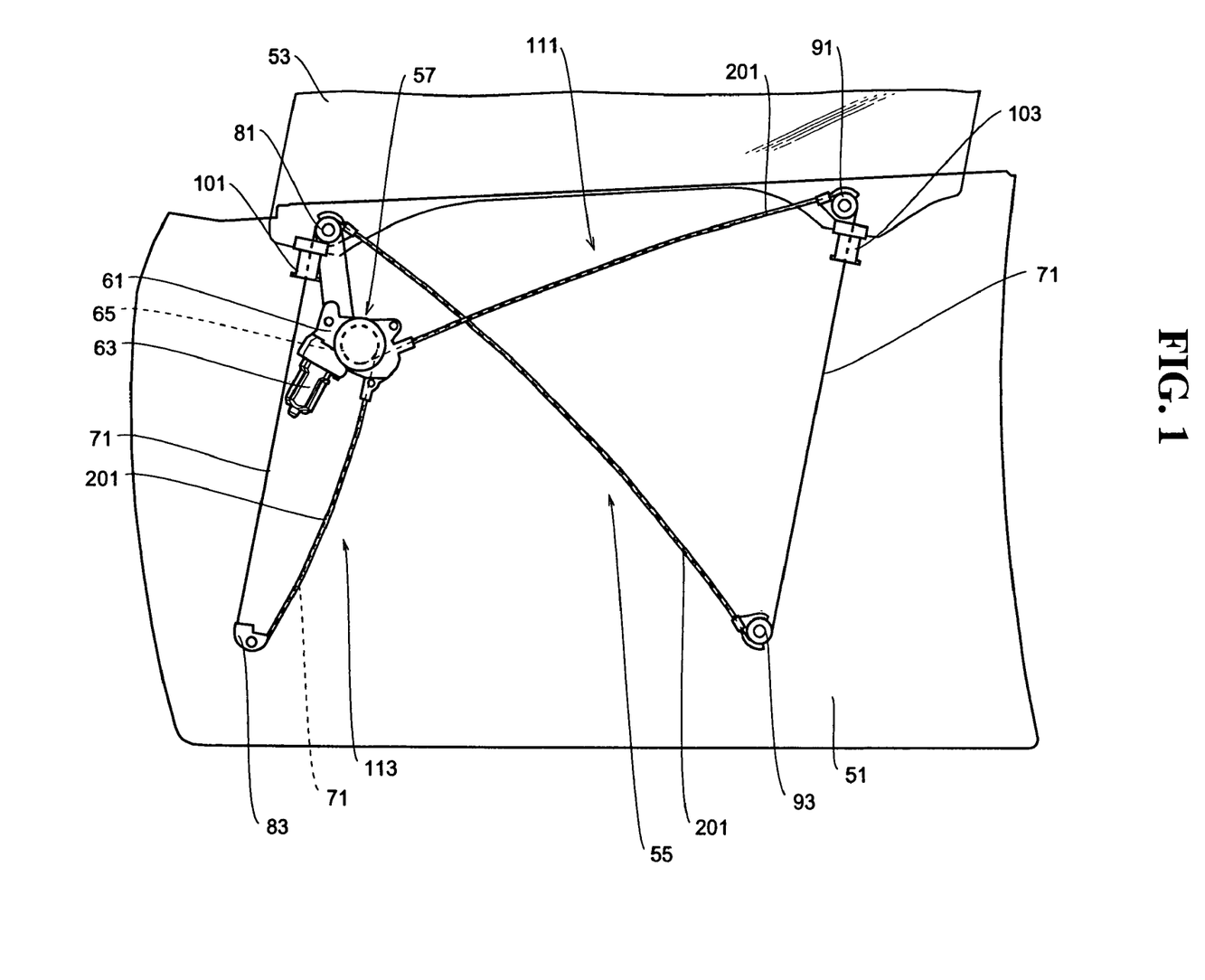
FIG. 1 is a drawing showing a door in a state in which a window regulator in an embodiment is provided and an inner panel is removed viewed from the cabin side.
Figure 2:
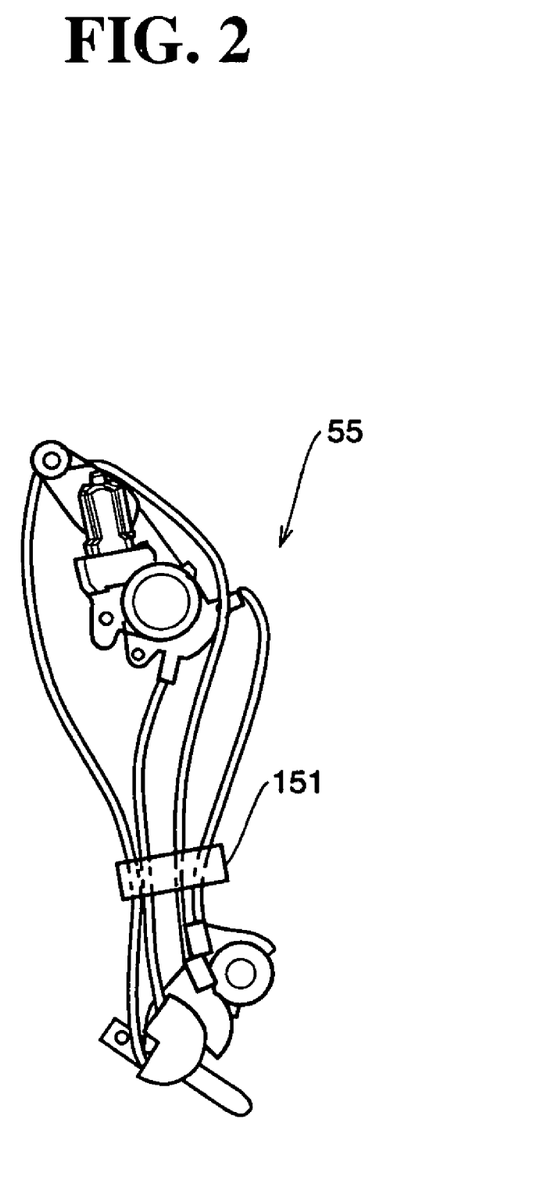
FIG. 2 is a perspective view of the window regulator to be assembled.

Referring first to FIG. 1 and FIG. 2, a window regulator according to an embodiment will be described. FIG. 1 is a drawing showing a door in a state in which the window regulator in the embodiment is provided and an inner panel is removed viewed from the cabin side, and FIG. 2 is a perspective view of the window regulator to be assembled.

Figure 8:
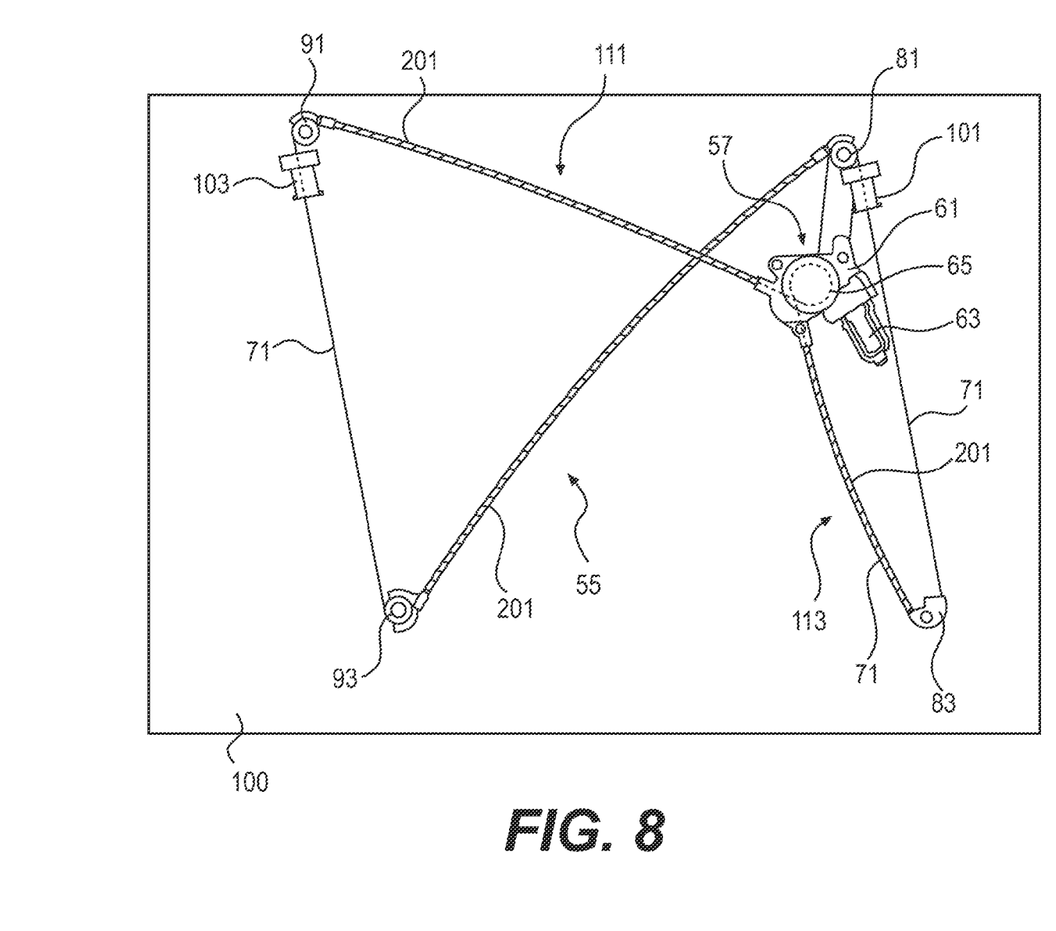
FIG. 8 is a view of the window regulator of FIG. 1 disposed on the inner panel of the door.

As shown in FIG. 1, the window regulator 55 for moving a window glass 53 upward and downward is disposed in a space between the inner panel 100 (FIG. 8) (a panel on the inside) and an outer panel (a panel on the outside) which constitute a door panel.

A configuration of the window regulator 55 will be described. A wire drive unit 57 is mounted to the inner panel 100 on a surface facing the outer panel. The wire drive unit 57 is rotatably provided on a base 61, and is provided with a drum 65 which is driven to rotate in the forward direction or the reverse direction by a motor 63.

A wire 71 is formed substantially into an annular shape and is partly wound around the drum 65.

A first upper guide member 81, a first lower guide member 83, a second upper guide member 91 and a second lower guide member 93 which function as wire guide members for guiding the wire 71 are provided along the direction of upward and downward movement of the window glass 53 on the inner panel 100 on the surface facing the outer panel 51.

In the embodiment, pulleys are used for these members other than the first lower guide member 83 and a fixed guide formed with a groove for allowing engagement of the wire 71 on the outer peripheral surface thereof is used as the first lower guide member.

The wire 71 is routed in a substantially N-shape in the order of the first lower guide member 83, the first upper guide member 81, the second lower guide member 93 and the second upper guide member 91.

First window glass mounting means (glass holder) 101 for mounting the window glass 53 is provided on the wire 71 between the first upper guide member 81 and the first lower guide member 83 (a portion of the wire 71 along the direction of the upward and downward movement of the window glass 53).

Second window glass mounting means (glass holder) 103 for mounting the window glass 53 is provided on the wire 71 between the second upper guide member 91 and the second lower guide member 93 (a portion of the wire 71 along the direction of the upward and downward movement of the window glass 53).

The window regulator 55 is provided with a wire sag compensating mechanism for compensating the sag of the wire 71. In the embodiment, a second wire sag compensating mechanism 113 is provided between the wire drive unit 57 and the first lower guide member 83, and a first wire sag compensating mechanism 111 is provided between the wire drive unit 57 and the second upper guide member 91. Since the structures of the first wire sag compensating mechanism 111 and the second wire sag compensating mechanism 113 are the same, description will be made on the second wire sag compensating mechanism 113 referring to FIG. 3, and description of the structure of the first wire sag compensating mechanism will be omitted.

Figure 3:
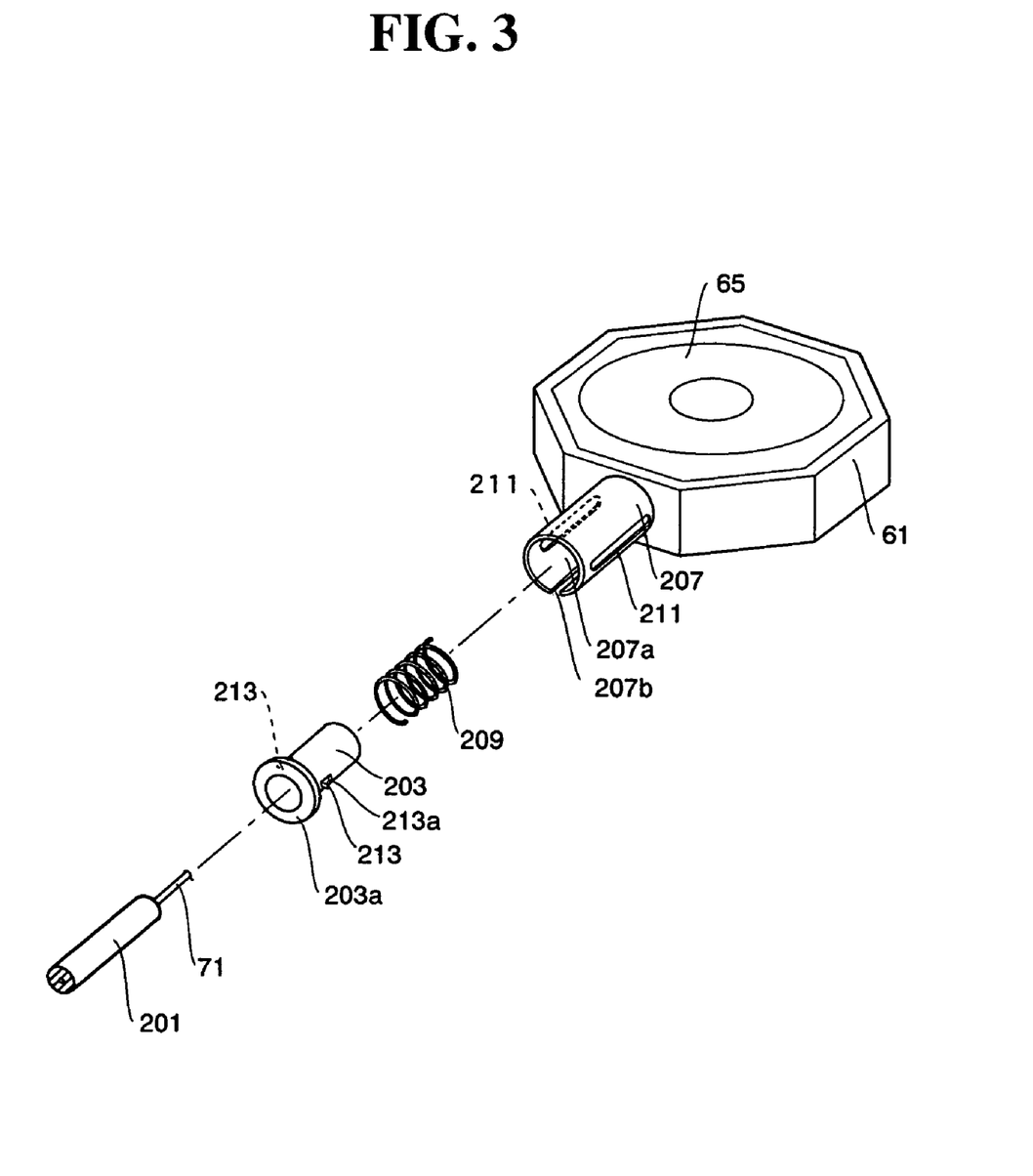
FIG. 3 is a perspective view of a first wire sag compensating mechanism in FIG. 1.

In FIG. 3, an outer tube 201 having the wire 71 passed therethrough and being fixed to a member on which the first lower guide member 83 is provided at an end thereof on the first lower guide member 83 side is arranged between the vicinity of the drum 65 and the vicinity of the first lower guide 83.

A slide bush 203 for allowing passage of the wire 71 therethrough is attached to the outer tube 201 on the drum 65 side.

On the other hand, the base 61 having the drum 65 provided thereon is formed with a cylindrical tube holding portion 207 as guide means having an opened surface 207a at one end for allowing the slide bush 203 of the outer tube 201 to be movably fitted thereto through the opened surface 207a.

A spring 209 as urging means is arranged in the tube holding portion 207. One end of the spring 209 comes into abutment with the bottom of the tube holding portion 207, and the other end thereof comes into abutment with a flange 203a formed on the slide bush 203 of the outer tube 201 on the outer tube 201 side, and urges the outer tube 201 in the direction to be pushed out from the tube holding portion 207.

The tube holding portion 207 is formed with two elongated holes 211 on a cylindrical surface along the axial direction. The slide bush 203 is formed with two projections 213 which engage the elongated holes 211. The projections 213 formed on the slide bush 203 abut against the end portions of the elongated holes 211 of the tube holding portion 207, so that further movement of the slide bush 203 is restricted. In other words, the elongated holes 211 and the projections 213 constitute disengagement restricting means for restricting the outer tube 201 from being disengaged from the tube holding portion 207 as the guide means.

The tube holding portion 207 is formed with a slit 207b extending to the opened surface 207a on the cylindrical surface thereof along the axial direction. The projections 213 also each have an inclined surface 213a which is reduced in height along the elongated hole 211 toward the drum 65.

The window regulator 55 is bunched with a band 151 as shown in FIG. 2 so as to prevent the wire portion from being entangled, and supplied for assembly.

An operation of the above-described configuration will be described below.

The first wire sag compensating mechanism III and the second wire sag compensating mechanism 113 absorb the sag of the wire 71 and prevent the wire 71 from coming off the guide member. When the drum 65 is rotated in the forward direction or the reverse direction by driving the motor 63 to move the wire 71, the window glass 53 mounted to the wire 71 is moved upward and downward via the first window glass mounting means 101 and the second window glass mounting means 103.

In this configuration, following effects are achieved.

(1) With the provision of the disengagement restricting means for restricting the outer tube 201 from being disengaged from the tube holding portion 207 as the guide means, the window regulator having the first and second wire sag compensating mechanisms 111, 113 for preventing the outer tube 201 from coming apart from the tube holding portion 207 is obtained.

(2) By the abutment of the projections 213 formed on the slide bush 203 against the end portions of the elongated holes 211 of the tube holding portion 207, further movement of the slide bush 203 may be restricted.

(3) The tube holding portion 207 is formed with the slit 207b extending to the opened surface 207a on the cylindrical surface thereof along the axial direction. The projections 213 each have the inclined surface 213a which is reduced in height along the elongated hole 211 toward the drum 65.

Therefore; when inserting the slide bush 203 into the tube holding portion 207, the tube holding portion 207 is enlarged in diameter by the inclined surfaces 213a of the projections 213 of the slide bush 203, and hence easy insertion of the slide bush 203 into the tube holding portion 207 is ensured.

Figure 4:
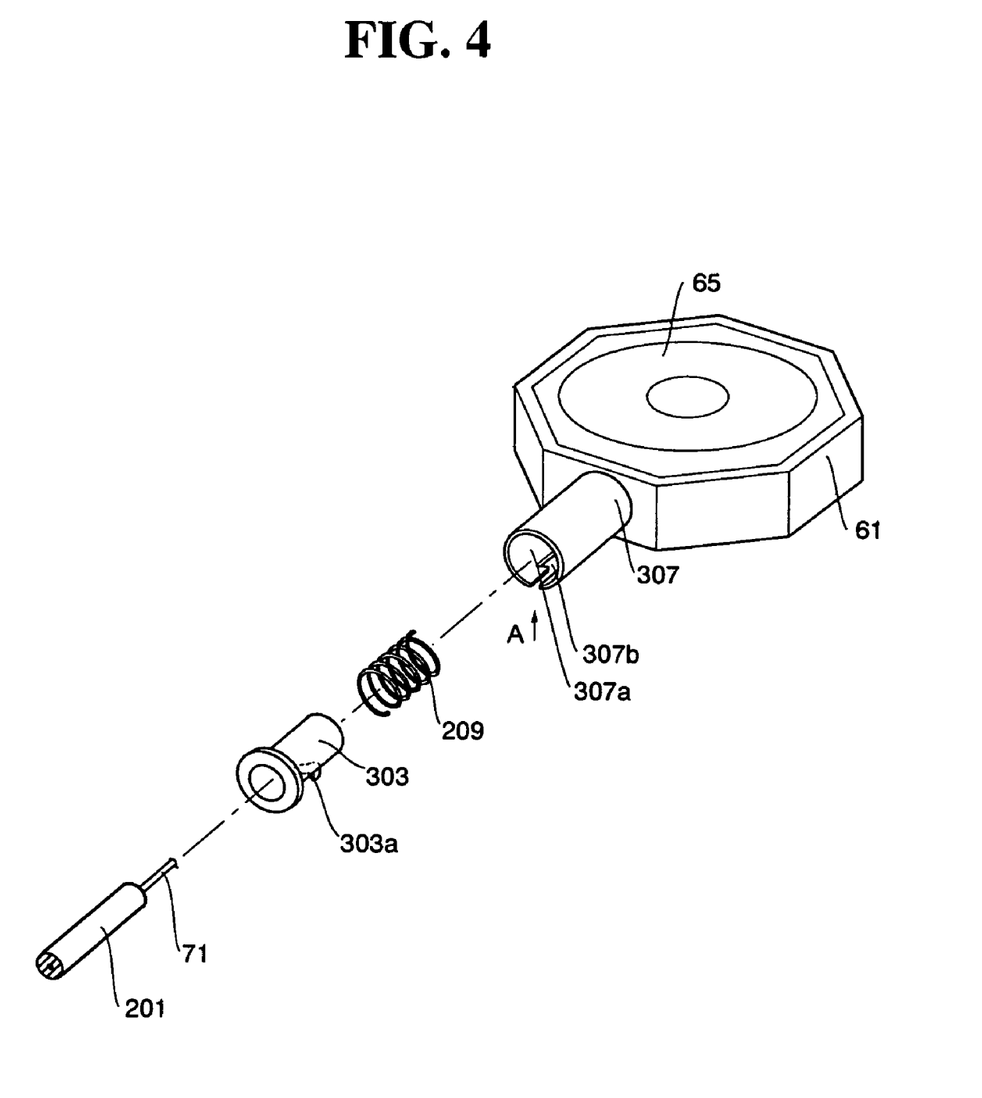
FIG. 4 is a perspective view of a wire sag compensating mechanism in another embodiment.
Figure 5:
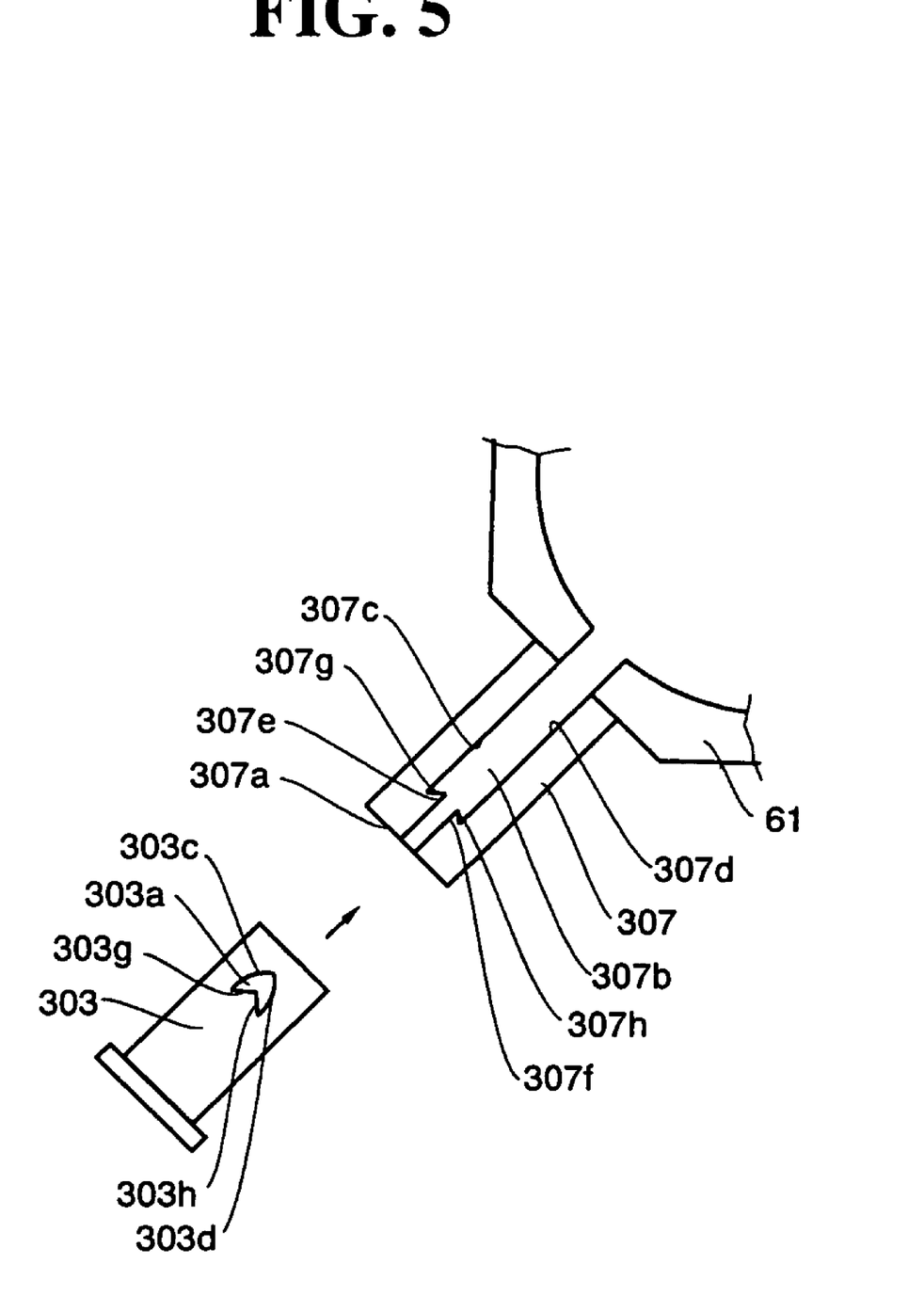
FIG. 5 is a drawing viewed in the direction indicated by an arrow A in FIG. 4.

The present invention is not limited to the embodiment shown above. For example, the disengagement restricting means for restricting the outer tube from being disengaged from the guide means may have the shape as shown in FIG. 4 and FIG. 5. In FIG. 4 and FIG. 5, portions different from the one in FIG. 3 are the slide bush and the tube holding portion and other portions are the same. Therefore, the same parts are designated by the same reference numerals and overlapped description is omitted. FIG. 4 is an exploded perspective view and FIG. 5 is a drawing viewed in the direction indicated by an arrow A in FIG. 4.

A slide bush 303 is formed with a projection 303a on the peripheral surface thereof. The projection 303a is adapted to be fitted to a slit 307b of a tube holding portion 307.

The disengagement restricting means in this embodiment includes first and second slit projections 307e, 307f formed in the vicinity of opened surfaces 307a on two surfaces 307c, 307d facing to each other which constitute the slit 307b of the tube holding portion 307 and the projection 303a formed on the slide bush 303 as shown in FIG. 5.

The first slit projection 307e projects toward the surface 307d (the other surface) which faces the surface 307c provided with the first slit projection 307e, and is formed with an engaged surface 307g on the drum 65 side. In the same manner, the second slit projection 307f projects toward the surface 307c (the other surface) which faces the surface 307d provided with the second slit projection 307f and is formed with an engaged surface 307h on the drum 65 side.

The projection 303a of the slide bush 303 is formed with first and second engaging surfaces 303g, 303h which are engageable with the engaged surfaces 307g, 307h of the first and second slit projections 307e, 307f.

The engaged surfaces 307g, 307h of the first and second slit projections 3.07e, 307f and the first and second engaging surfaces 303g, 303h of the projection 303a are designed to shapes so as to restrict the further movement of the slide bush 303 and prevent enlargement in diameter of the tube holding portion 307 by the engagement therebetween.

The drum 65 side of the projection 303a of the slide bush 303 is formed with surfaces 303c, 303d which come into abutment with the first slit projection 307e and the second slit projection 307f of the tube holding portion 307 when inserting the slide bush 303 into the tube holding portion 307, and enlarge the width of the slit.

In this configuration, the following effects are achieved.

(1) The tube holding portion 207 is formed with the elongated holes 211 on the peripheral surface thereof. Therefore, when molding the tube holding portion 207 with resin, a trimming die is necessary to form the elongated holes 211, and hence the cost of the die increases. On the other hand, the tube holding portion 307 in this embodiment has no elongated holes, the trimming die is not necessary correspondingly, so that the cost of the die is reduced.

(2) The engaged surfaces 307g, 307h of the first and second slit projections 307e, 307f and the first and second engaging surfaces 303g, 303h of the projection 303a are designed to shapes so as to restrict further movement of the slide bush 303 by the engagement therebetween, and prevent enlargement in diameter of the tube holding portion 307. Therefore, retention is further enhanced.

(5) The drum 65 side of the projection 303a of the slide bush 303 is formed with the surfaces 303c, 303d which come into abutment with the first slit projection 307e and the second slit projection 307f of the tube holding portion 307 when inserting the slide bush 303 into the tube holding portion 307, and enlarge the width of the slit. Therefore, easy insertion of the slide bush 303 into the tube holding portion 307 is ensured.

The present invention is not limited to the embodiments shown above. In the embodiments shown above, the description is made with an example in which the wire sag compensating mechanism is provided on the drum 65 side. However, the wire sag compensating mechanism may be provided on the first lower guide member 83 side or the second upper guide member 91 side.

Furthermore, as shown in FIG. 3, the tube holding portion 207 is formed with the two elongated holes 211 and the slide bush 203 is formed with the two projections 213 which engage the elongated holes 211. However, one elongated hole and one projection, or three or more elongated holes and three or more projections are also applicable.

DESCRIPTION OF THE REFERENCE NUMERALS AND SIGNS 65 drum
71 wire
201 outer tube
203 slide bush
209 spring
211 elongated holes
213 projections

The invention claimed is:

1. A window regulator comprising:
   a drum mounted to an inner panel of a door on a surface facing an outer panel and being capable of rotating in a forward direction and a reverse direction;
   an annular wire wound partly around the drum;
   a plurality of rotatable wire guide members mounted directly to the inner panel of the door on the surface facing the outer panel for guiding the wire so that the wire is arranged along a direction of upward and downward movement of a window glass; and
   window glass mounting means for mounting the window glass to the wire at a portion along the direction of upward and downward movement of the window glass,
   wherein the window glass is moved upward and downward by moving the wire by rotating the drum in the forward direction or the reverse direction,
   wherein the window regulator further comprises a wire sag compensating mechanism including:
   an outer tube arranged between a vicinity of the drum and a vicinity of at least one of the wire guide members for allowing passage of the wire therethrough and fixed to one of a drum side and a wire guide member side;
   guide means provided on the other one of the drum side and the wire guide member side for allowing movable engagement of the outer tube therewith and guiding the outer tube in an axial direction of the outer tube;
   urging means for urging the outer tube in a direction away from the guide means; and
   disengagement restricting means for restricting the outer tube from being disengaged from the guide means, and wherein:
   a slide bush which allows passage of the wire therethrough is formed with a projection on a peripheral surface thereof and is attached to the outer tube on the guide means side,
   the guide means is a cylindrical tube holding portion having an opened surface at one end, being formed with a slit extending to the opened surface along the axial direction for allowing movable fitting of the slide bush of the outer tube through the opened surface so that the projection of the slide bush fits the slit, the urging means is a spring which comes into abutment with a member having the guide means at one end and comes into abutment with the slide bush of the outer tube at the other end for urging the outer tube in the direction to be pushed out from the tube holding portion, the disengagement restricting means includes first and second slit projections formed in the vicinity of the opened surface on two surfaces facing each other which constitute the slit of the tube holding portion respectively and projecting toward opposite surfaces where the projections by themselves are formed, and having engaged surfaces on the side of the member provided with the guide means and a projection of the slide bush engageable with the engaged surfaces of the first and second slit projections and having first and second engaging surfaces, and the engaged surfaces of the first and second slit projections and the first and second engaging surfaces of the projection are designed so as to restrict further movement of the slide bush and prevent enlargement in diameter of the tube holding portion by engagement therebetween.

2. The window regulator according to claim 1, wherein the projection of the slide bush is formed with surfaces which come into abutment with the first slit projection and the second slit projection of the tube holding portion on the side of the member provided with the guide means, and enlarge the width of the slit when the slide bush is inserted into the tube holding portion.

* * * * *